E. C. DIETRICH AND C. W. BLISS.
TROLLEY HARP FASTENER.
APPLICATION FILED FEB. 9, 1920.

1,356,606. Patented Oct. 26, 1920.

Witness:
C. A. Towsley.

Inventors
Edward C. Dietrich
Charles W. Bliss.
By Louis C. Vanderlip.
Attorney

UNITED STATES PATENT OFFICE.

EDWARD C. DIETRICH AND CHARLES W. BLISS, OF SOUTH BEND, INDIANA.

TROLLEY-HARP FASTENER.

1,356,606.  Specification of Letters Patent.  Patented Oct. 26, 1920.

Application filed February 9, 1920. Serial No. 357,259.

*To all whom it may concern:*

Be it known that we, EDWARD C. DIETRICH and CHARLES W. BLISS, citizens of the United States, and residents of the city of South Bend, county of St. Joseph, Indiana, have invented certain new and useful Improvements in Trolley-Harp Fasteners, of which the following is a specification.

This invention relates to trolley harps and more especially to means for fastening the harp to the upper end of a trolley pole.

An object of our invention is the production of a trolley harp provided with expander means for fastening it to the trolley pole or carrier. Other objects of our invention are mentioned and described herein.

Figure 1:
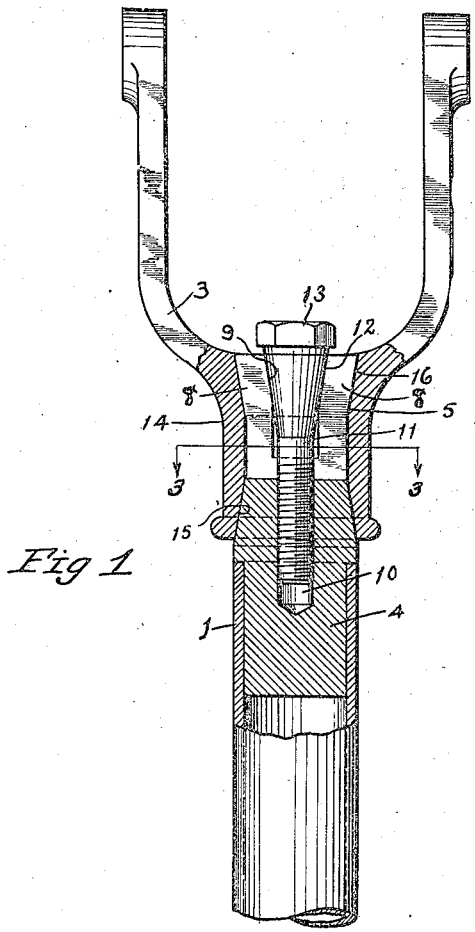
Figure 2:
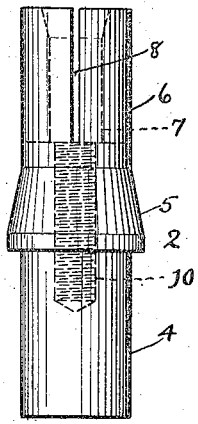
Figure 3:
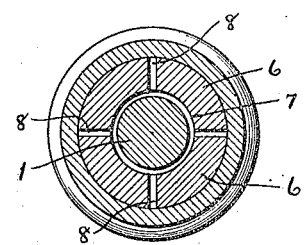
Figure 4:
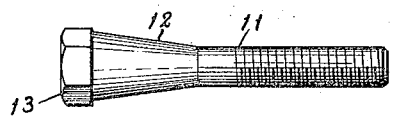
Figure 5:
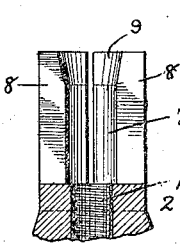

The preferred embodiment of our invention is illustrated in the accompanying drawing in which Figure 1 is a view in elevation, partially in section, showing our invention applied to a pole or harp carrier; Fig. 2 is a view showing the harp carrier; Fig. 3 is a section taken on the line 3—3 of Fig. 1; Fig. 4 is a view showing the expander bolt; and Fig. 5 is a fragment in section showing the upper end of the harp carrier.

Similar numerals of reference indicate like members throughout the several views on the drawing.

Referring to the drawing in detail the numeral 1 indicates the top end of a tubular trolley pole adapted to carry the trolley harp support or base member 2 and a harp 3 mounted on the latter, as hereinafter described. The harp support 2 may be provided with the cylindrical shank portion 4 which is adapted to be rigidly fastened within the upper end of the tubular pole 1 in any suitable manner.

The support or carrier 2 may be formed also with the tapered harp seat portion 5 which merges with the cylindrical expansible portion 6 which may be bored longitudinally at 7 and provided with a plurality of radially formed slots 8, 8, the latter extending from the end of the portion 6 longitudinally thereof to a point adjacent the termination of the tapered section 5 and communicating with the bore 7. The end of the bore 7 of the carrier 2 may be provided with a tapered or flaring enlargement 9.

Numeral 10 indicates an expander bolt socket formed axially of the bore 7 and which may be somewhat smaller in diameter than the bore 7, which bolt socket is screw threaded to receive the threaded shank of the expander bolt 11. The bolt 11 may be provided with a tapered portion 12 and a head 13 adapted to be engaged by a wrench or tool to rotate said bolt. The harp 3 may have a hollow or tubular hub portion 14 adapted to be mounted on the carrier 2 which may be provided with the tapered bore 15 corresponding with the tapered portion 5 of the support 2 and which is adapted to engage and seat thereon. The numeral 16 indicates a second tapered bore section of the harp hub 14 opposite the tapered bore 15 into which the several segments of the split carrier section 6 may be expanded when the expander bolt 11 is inwardly actuated in the socket 10.

Preferably, the harp support 2 is formed of resilient metal such as steel so that, when the bolt 11 is screwed into its socket 10, the conical portion 12 engaging the conical bore 9 and effecting the expansion of the upper ends of the several segments of the split carrier section 6 into the tapered bore 16 of the harp hub, whereby the split section 6 becomes somewhat wedge shaped, and whereby the harp 3 is rigidly confined on the carrier 2 against longitudinal movement.

We claim:

1. A trolley harp comprising a harp body provided with a bored hub; a split expansible harp carrier arranged within said harp hub bore; and expanding means for spreading and expanding said split harp carrier against the wall of said harp hub bore to prevent the displacement of said harp body from said carrier member.

2. A trolley pole harp comprising a harp body provided with a bored hub; a split expansible harp carrier arranged with said harp hub bore; and expanding means carried by the harp carrier for spreading and expanding said split harp carrier against the wall of said harp hub bore to prevent the displacement of said harp body from said carrier member.

3. A trolley pole harp comprising a harp body provided with a hub having a bore; a furcated harp carrier having its furcations disposed within said harp hub bore; and means for expanding and spreading said harp carrier furcations against the wall of said harp hub bore for rigidly securing said harp upon said carrier.

4. A trolley pole harp comprising a harp body provided with a hub having a tapered bore; a furcated harp carrier having its furcations disposed within said harp hub bore; and means for expanding and spreading said harp carrier furcations against the wall of said harp hub bore for rigidly securing said harp upon said carrier.

5. A trolley pole harp comprising a harp body provided with a hub having a bore; a furcated harp carrier having its prongs disposed within said harp hub bore; a harp carrier prong expanding member mounted upon said harp carrier and movable longitudinally thereof and adapted to spread said carrier prongs into the harp hub bore when longitudinally actuated; and means for longitudinally actuating said prong expanding member.

6. A trolley pole harp comprising a harp body provided with a hub having a bore; a bored and furcated harp carrier having its prongs disposed within said harp hub bore; a harp carrier prong expanding member arranged within the bore thereof, provided with a screw thread mounting and movable longitudinally within said bore and adapted to spread said carrier prongs into the harp hub bore when longitudinally actuated; and means for longitudinally actuating said prong expanding member.

7. A trolley pole harp comprising a harp body provided with a hub having a bore; a bored and furcated harp carrier having its prongs disposed within said harp hub bore, a portion of said bore being tapered; a harp carrier prong expanding member arranged within the carrier bore and movable longitudinally thereof, said expander member being provided with a tapered portion adapted to engage the tapered bore of said carrier when the expander member is longitudinally actuated; and means for longitudinally actuating said expander member, whereby said carrier prongs are spread into the harp hub bore and against the wall thereof, thereby preventing displacement of the harp from said carrier.

In testimony whereof we have hereunto affixed our signatures this 4th day of February, 1920.

EDWARD C. DIETRICH.
CHARLES W. BLISS.